(12) United States Patent
Miyasato et al.

(10) Patent No.: US 8,205,729 B2
(45) Date of Patent: Jun. 26, 2012

(54) SHOCK ABSORBER

(75) Inventors: Eiko Miyasato, Tsukubamirai (JP); Soichi Sato, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 649 days.

(21) Appl. No.: 12/144,113

(22) Filed: Jun. 23, 2008

(65) Prior Publication Data

US 2009/0001636 A1    Jan. 1, 2009

(30) Foreign Application Priority Data

Jun. 27, 2007   (JP) ................................. 2007-169174

(51) Int. Cl.
*F16F 9/48* (2006.01)

(52) U.S. Cl. ......................... 188/286; 188/284; 188/288

(58) Field of Classification Search .......... 188/283–287, 188/288, 316, 322.19
See application file for complete search history.

(56) References Cited

U.S. PATENT DOCUMENTS

| | | | | |
|---|---|---|---|---|
| 3,998,302 A | * | 12/1976 | Schupner ...................... | 188/285 |
| 4,059,175 A | * | 11/1977 | Dressell et al. ............... | 188/285 |
| 4,133,415 A | * | 1/1979 | Dressell et al. ............... | 188/285 |
| 4,185,719 A | * | 1/1980 | Farris et al. ...................... | 188/33 |
| 4,298,101 A | * | 11/1981 | Dressell et al. ............... | 188/285 |
| 5,000,299 A | * | 3/1991 | Goto et al. ................. | 188/267.1 |
| 5,169,131 A | * | 12/1992 | Shimura ........................ | 267/221 |
| 5,566,794 A | * | 10/1996 | Wiard ........................... | 188/287 |
| 5,598,904 A | * | 2/1997 | Spyche, Jr. ..................... | 188/287 |
| 6,006,873 A | * | 12/1999 | Kirst .............................. | 188/287 |
| 6,443,271 B2 | * | 9/2002 | Schmidt ........................ | 188/285 |
| 2001/0052441 A1 | * | 12/2001 | Schmidt ........................ | 188/280 |

FOREIGN PATENT DOCUMENTS

| | | |
|---|---|---|
| DE | 93 13 280.8 | 1/1994 |
| JP | 62-194946 | 12/1987 |
| JP | 2000-18308 | 1/2000 |
| JP | 2004-11786 | 1/2004 |
| KR | 1999-022457 | 3/1999 |
| WO | WO 96/39589 | 12/1996 |

OTHER PUBLICATIONS

U.S. Appl. No. 12/598,440, filed Nov. 2, 2009, Miyasoto.

* cited by examiner

*Primary Examiner* — Bradley King
*Assistant Examiner* — Vishal Sahni
(74) *Attorney, Agent, or Firm* — Oblon, Spivak, McClelland, Maier & Neustadt, L.L.P.

(57) ABSTRACT

A cylinder chamber filled with a liquid, a piston disposed inside the cylinder chamber, a piston rod connected to the piston, and an accumulator allowing the piston rod to generate a damping force by receiving the liquid from a compression side of the cylinder chamber are included, and on an internal periphery of the cylinder chamber, one line of a helical damping groove is formed within a stroke range of the piston, a groove width of the damping groove is constant over the entire length of the damping groove, a depth of the damping groove gradually decreases along a spiral toward the direction in which the piston rod is pushed in, and a length of the piston in a direction along the axis line is smaller than a pitch of the damping groove.

5 Claims, 4 Drawing Sheets

SHOCK ABSORBER

TECHNICAL FIELD

The present invention relates to a shock absorber that allows a piston rod to generate a damping force by controlling an outflow of a liquid from the compression side of a cylinder chamber due to movement of a piston in the cylinder chamber, and absorbs a mechanical impact applied to the piston rod by the damping force.

BACKGROUND ART

A shock absorber that is previously well known from document 1 (Japanese Unexamined Utility Model Registration Application Publication No. S62-194946) or the like is provided with a cylinder chamber in a tube, the cylinder chamber enclosing a liquid therein, a piston dividing the cylinder chamber into two chambers, and a piston rod, one end of which is connected to the piston and the other end of which extends out from the tube, and allows the piston rod to generate a damping force by controlling an outflow of a viscous liquid from the compression side of the cylinder chamber due to sliding of the piston in the cylinder chamber.

What is described in the document 1 as a prior art is such that, as a shock absorber that controls an outflow of a liquid from the compression side of a cylinder chamber due to movement of a piston, a cylinder sealed at one end is constructed to be double-walled, a plurality of through holes disposed on the inner cylinder wall surface at a predetermined pitch in a direction of the cylinder axis are formed, and a viscous fluid, which is precluded when the piston moves inside the inner cylinder in its axis direction, is allowed to flow outside the inner cylinder through the through holes.

Then, what is described in the document 1 as the invention is such that an inner tube is disposed inside an outer tube with a predetermined clearance, a viscous liquid is enclosed in a liquid chamber between both the tubes and a cylinder chamber in the inner tube, a throttle valve is installed in a connecting passage for connecting the liquid chamber and the cylinder chamber, and further a cross-sectional area of the flow passage between an external periphery of a piston and the internal periphery of the inner tube becomes gradually smaller toward the direction in which a piston rod is pushed in, by making an internal periphery of the inner tube tapered so that its inner diameter is gradually decreased toward the direction in which the piston rod is pushed in.

However, this type of shock absorber, that is capable of controlling an amount of liquid flowing out in dependence of a piston stroke, has a configuration such that a liquid discharged from the compression side of the cylinder chamber, when the piston rod is moved toward the direction of being pushed in due to a mechanical impact applied to the piston rod, is transferred to between the inner tube and the outer tube; thereby the cylinder tube must consequentially be constructed to be double-walled, which results in a problem that the number of parts becomes large and the structure becomes complicated. Moreover, when a tapered portion is provided on the internal periphery of an inner tube, an accuracy of forming a tapered surface has a great effect on the cross-sectional area of a flow passage defined by the clearance between an external periphery of a piston and the internal periphery of the inner tube, so there was a problem not only that high accuracy manufacturing of the tapered surface is required, but also that it was difficult to accurately control a damping force being applied to the piston rod.

DISCLOSURE OF INVENTION

The technical problem of the present invention is, in a shock absorber having a cross-sectional area of a flow passage between an external periphery of a piston and an internal periphery of a tube, the cross-sectional area decreasing gradually toward the direction in which a piston rod is pushed in, to linearly increase a load applied to a fluid flowing between the external periphery of the piston and an internal periphery of a cylinder chamber substantially in proportion to a stroke of the piston rod in the direction of being pushed, by a simple process of providing a damping groove on the internal periphery of the tube, and to enable the damping force applied to the piston rod to be accurately controlled.

In order to solve the above problem, the present invention provides a shock absorber including a cylinder chamber formed in a tube and filled with a liquid, a piston disposed in the cylinder chamber so as to be freely displaced in a direction along the axis line of the cylinder chamber, a piston rod, one end of which is connected to the piston and the other end of which extends out from the tube, and an accumulator allowing the piston rod to generate a damping force by receiving the liquid from the compression side of the cylinder chamber when the piston rod is pushed into the tube by an impact force and the piston is displaced.

On an internal periphery of the cylinder chamber, one turn of a helical damping groove, inclined relative to the axis line, is formed so as to extend within a stroke range of the piston, a groove width of the damping groove is constant over the entire length of the damping groove, a depth of the damping groove gradually decreases along a spiral toward the direction in which the piston rod is pushed in, and a length of the piston in a direction along the axis line is made smaller than a pitch of the damping groove.

According to the above shock absorber of the present invention, it becomes possible to linearly increase a load applied to a fluid flowing between the external periphery of the piston and the internal periphery of the cylinder chamber substantially in proportion to a stroke of the piston rod in the direction of being pushed, by a relatively simple process of forming one turn of a helical damping groove, the depth of which is gradually lessened, on the internal periphery of the tube, and to enable the damping force applied to the piston rod to be accurately controlled.

It is preferable in the present invention that an axis-line-direction groove width of the damping groove along the axis line is formed to be substantially equal to or above the length of the piston, and also that a bottom wall of the damping groove is to be flat.

In the present invention, one pitch of the damping groove may be formed in a stroke range of the piston, and the piston may be supported at the tip of the piston rod in a floating state.

It is preferable in the present invention that a rod-guiding-out side end of the cylinder chamber is connected to an elastic-member chamber constituting the accumulator, the elastic-member chamber being provided therein with a flexibly constrictable and expandable elastic member.

BEST MODE FOR CARRYING OUT THE INVENTION

Figure 1:
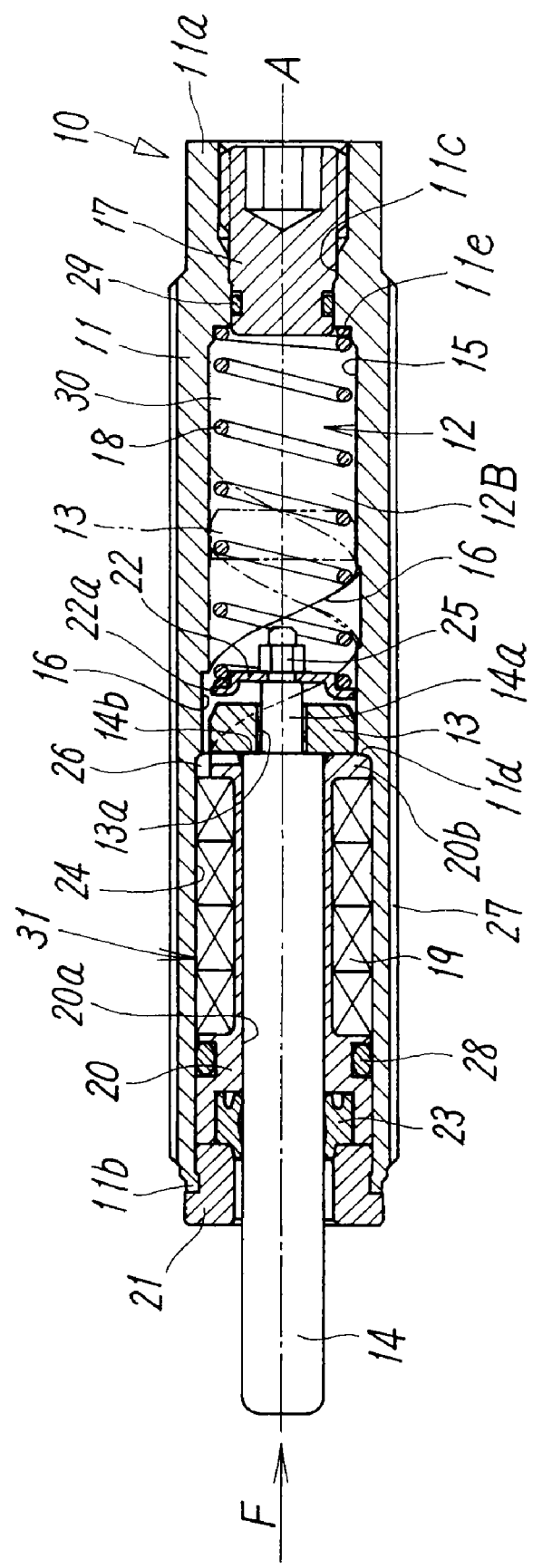
FIG. 1 is a vertical cross-sectional view of a shock absorber of the present invention.
Figure 2:
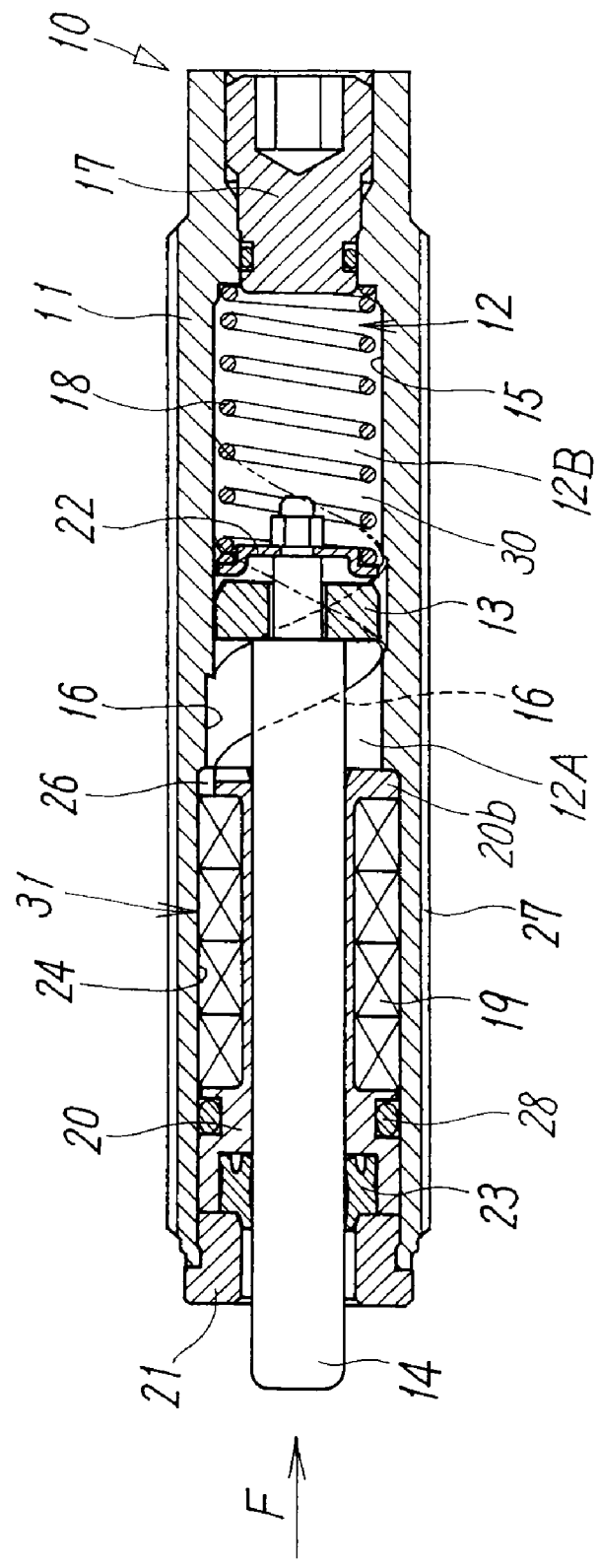
FIG. 2 is a vertical cross-sectional view of the above shock absorber in a state when it absorbs an impact.
Figure 3:
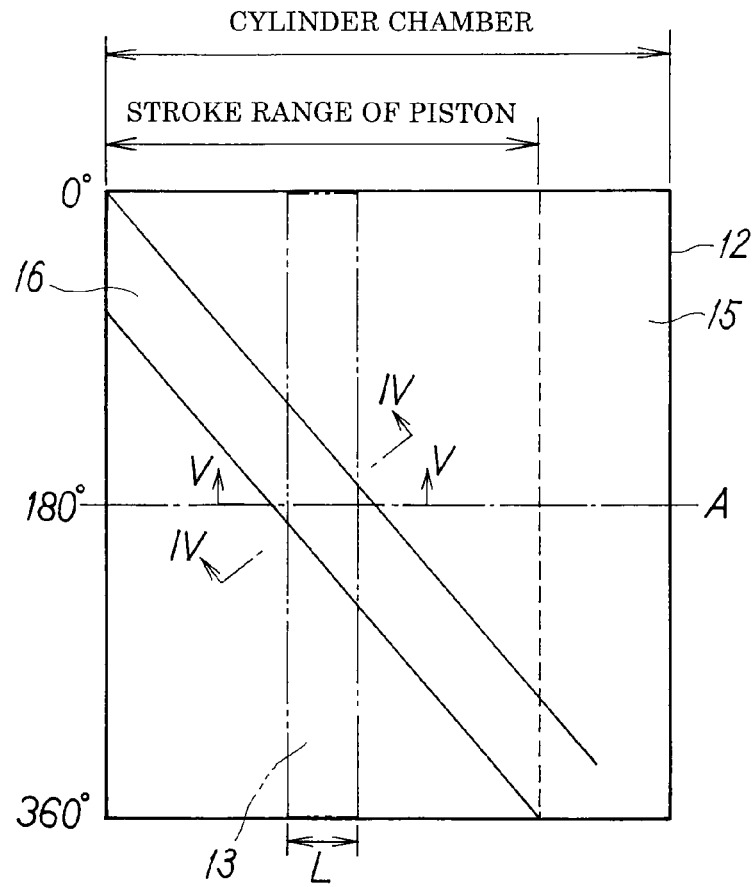
FIG. 3 is a developed view of a cylinder chamber.
Figure 4:
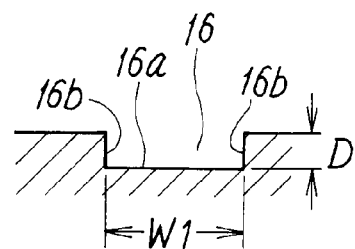
FIG. 4 is a cross-sectional view taken from line IV-IV of FIG. 3.
Figure 5:
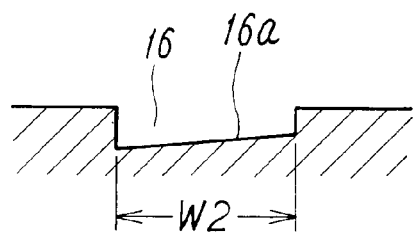
FIG. 5 is a cross-sectional view taken from line V-V of FIG. 3.

An embodiment of the present invention will now be described with reference to FIGS. 1 to 7. As shown in FIGS. 1 and 2, a shock absorber 10 of this embodiment has a cylindrical tube 11. A cylinder chamber 12 is formed in a half portion side (head side) of the tube 11 in the direction of its axis line A, a piston 13 connected to a piston rod 14 is inserted into the cylinder chamber 12 together with the piston rod 14 in the direction of the axis line A so as to be slidable, and the cylinder chamber 12 is divided by the piston 13 into the first cylinder chamber 12A on the side of the piston rod 14 and the second cylinder chamber 12B on the other side. Both ends of the cylinder chamber 12 are blocked by a flange portion 20b of a bearing casing 20, formed on a first end side of the bearing casing 20 in the direction of its axis line A, and a plug 17 screwed in an opening 11c on the head side end 11a of the tube 11, and the interior diameter of the cylinder chamber 12 is substantially constant over the entire length in the direction of the axis line A, except a portion of a damping groove 16.

A small-diameter portion 14a, which is formed at a base end portion of the piston rod 14, is loosely fitted into a center hole 13a of the piston 13, and a circular spring guide 22 is fixed with a nut 25 at the tip of the small-diameter portion 14a; thereby the piston 13 is supported in a floating state between a stepped portion 14b at one end of the small-diameter portion 14a and the spring guide 22 by the small-diameter portion 14a.

And, the piston rod 14 extending along the axis line A in the tube 11 passes though the sleeve-like bearing casing 20 provided in the other half portion side (rod side) of the tube 11, a seal 23 disposed along an inner perimeter on a second end side of the bearing casing 20 in the direction of the axis line A, and a rod cover 21 mounted at a rod-side end 11b of the tube 11; the tip of the piston rod 14 is projected outside the tube 11.

The bearing casing 20 constitutes a bearing portion 20a for guiding the piston rod 14 and is fixed to the tube 11 by being clamped between the rod cover 21 and a stepped portion 11d in the tube 11, and the seal 23 is fixed by being clamped between the bearing casing 20 and the rod cover 21.

An elastic-member chamber 24 constituting an accumulator 31 is formed between the external periphery of the bearing casing 20 and the internal periphery of the tube 11, and is provided therein with a flexibly constrictable and expandable elastic member 19 constituted of, for example, a closed-cell type member. Between a portion of the external periphery of the flange portion 20b of the bearing casing 20 and a portion of the internal periphery of the tube 11, there is provided a connection passage 26 for connecting the elastic-member chamber 24 and the first cylinder chamber 12A, and a liquid 30, preferably a viscous liquid 30 such as oil, is enclosed in the first and second cylinder chambers 12A, 12B, the connection passage 26 and the elastic-member chamber 24.

Incidentally, the first and second cylinder chambers 12A, 12B are connected each other through a gap between the external periphery of the piston 13 and the internal periphery of the tube 11, a small clearance between the internal periphery of the piston 13 and the external periphery of the small-diameter portion 14a of the piston rod 14, and the damping groove 16, which will be described later.

In such configuration, in a process that the piston rod 14 is pushed inside the tube 11 by a load F, what enters into the cylinder chamber 12 further from the state shown in FIG. 1 is only a portion (entered portion) of the piston rod 14. At this time, the liquid 30 of a volume corresponding to that of the entered portion of the piston rod 14 flows from the cylinder chamber 12 into the elastic-member chamber 24 through the connection passage 26, and is accommodated in the elastic-member chamber 24 by allowing the elastic member 19 to be constricted; a change in the volume in the cylinder chamber 12 is thereby compensated.

In a process that the piston rod 14 projects from the tube 11, in the converse of the above process, the liquid 30 is discharged from the elastic-member chamber 24 to refill the cylinder chamber 12.

A return spring 18 is installed between a hollow guide portion 22a on the periphery of the spring guide 22 and a spring retaining seat lie located at the head-side end of the cylinder chamber 12 in the tube 11; the piston 13 and piston rod 14 are forced by the return spring 18 in the direction in which the piston rod 14 is projected toward the outside of the tube 11. Incidentally, this return spring 18 is compressed when a mechanical impact is applied to the piston rod 14 in the direction of being pushed, and contributes to lessen the impact.

It is noted that the clearance between the external periphery on the second end side of the bearing casing 20 and the inner perimeter of the tube 11 is sealed by disposing an O-ring 28, and the clearance between the internal periphery on the second end side of the bearing casing 20 and the external periphery of the piston rod 14 is sealed by the seal 23. Moreover, the clearance between the external periphery of the plug 17, fixed by being screwed in the tube 11 at its head side end 11a, and the inner perimeter of the tube 11 is sealed by an O-ring 29. In addition, a mounting thread portion 27 is provided on the external periphery of the tube 11 over its substantially entire length; the shock absorber 10 is configured by the mounting thread portion 27 so as to be position-adjustable when mounted to given equipment.

On a cylindrical internal periphery 15 of the cylinder chamber 12, there is provided one line of the helical damping groove 16, inclined relative to the axis line A of the cylinder chamber 12, so as to encircle the axis line A. This damping groove 16 is for controlling a flow of the liquid 30 caused by sliding of the piston 13 in the cylinder chamber 12, and for allowing the piston rod 14 to generate a damping force. As known from a developed view of FIG. 3, this damping groove 16 is formed in a portion on the internal periphery 15 of the cylinder chamber 12, the portion being corresponding to a stroke range of the piston 13, so as to turn at least once on the internal periphery 15 of the cylinder chamber 12 from the rod-guiding-out-side end portion toward the head side thereof, i.e., so as to extend within the stroke range of the piston 13 on the order of one pitch.

The damping groove 16 has a flat groove bottom 16a and left and right groove side walls 16b vertical relative to the flat groove bottom 16a, and its groove width W1, i.e., the groove width W1 in a direction orthogonal to the spiral of the damping groove 16 is constant over the entire length of the damping groove 16. The depth D of the damping groove 16 gradually decreases along the spiral of the damping groove 16 toward the direction in which the piston rod 14 is pushed in, as shown exaggeratedly in the diagram of FIG. 7. Furthermore, a groove width W2 of the damping groove 16 in a direction along the axis line A, i.e. the axis-line-direction groove width W2 is formed so as to be substantially equal to or above the length L of the piston 13 in the direction of the axis line A. It is preferable that the axis-line-direction groove width W2 of the damping groove 16 is formed to be about from 1 to 2 times the length L of the piston 13. Therefore, the length L of the piston 13 is understandably smaller than the pitch of the damping groove 16.

It should be noted that although corner portions of the damping groove 16, at which the groove bottom 16a and the left and right groove side walls 16b join each other, each have a sharp angle in attached exemplary figures, the corner portions may have a gentle arc shape.

In this way, a flow passage in which the liquid 30 in the cylinder chamber 12 flows in the direction of the axis line A as the piston 13 moves, i.e. a flow passage in which the liquid 30 flows between the first cylinder chamber 12A and the second cylinder chamber 12B is formed by the damping groove 16 between the piston 13 and the internal periphery of the cylinder chamber 12. In this occasion, the liquid 30 flows in the damping groove 16 around the piston 13 in the direction of the axis line A while turning in a direction along the damping groove 16, but not linearly in a direction parallel to the axis line A along the outer peripheral surface of the piston 13. That is, the liquid 30 flows in a helical direction as a mixed flow of the turning flow and the axis-line direction flow, and a braking force is applied to the piston 13 due to viscous drag of the liquid 30 at this time.

In addition, since the damping groove 16 diagonally crosses the peripheral surface of the piston 13, the flow passage is formed in a slanting direction, so the length of the flow passage is longer than that of a flow passage extending straight in the direction of the axis line A and the braking force is accordingly increased. Furthermore, since the liquid 30 flows not straight in a direction parallel to the axis line A but in a helical direction, the braking force is also thereby increased. As a consequence, it becomes possible to effectively generate a braking force by using the piston having a short length. Moreover, since the depth of the damping groove 16 is gradually decreased toward the direction in which the piston rod 14 is pushed in, a flow rate of the liquid 30 passing through the passage in the damping groove 16 is controlled to a large extent, and accordingly the outflow of the liquid 30 from the second cylinder chamber 12B is effectively controlled, an appropriate damping force is generated in the piston rod 14, and a mechanical impact applied to the piston rod 14 can be absorbed.

Furthermore, since the damping groove 16 is formed so as to go around the internal periphery 15 of the cylinder chamber 12 at least one round, the external periphery of the piston 13 can be prevented from being unevenly worn.

In a shock absorber constituted as described above, when the shock absorber is in a not-operated state, in which the piston 13 and piston rod 14 are positioned at the projected end of the stroke, the external periphery of the piston 13 faces a portion of the damping groove 16 in which its depth is maximal and the cross-sectional area of the flow passage connecting the second cylinder chamber 12B and the first cylinder chamber 12A is also maximal. In this state, when a mechanical impact F is applied to the tip of the piston rod 14 in the direction of being pushed, it is transmitted to the piston 13 and allows the piston 13 to move in the direction of being pushed; thereby the liquid 30 in the second cylinder chamber 12B is pressurized and the pressurized liquid 30 flows to the side of the first cylinder chamber 12A mainly through the damping groove 16 having the maximum cross-sectional area.

Incidentally, although the liquid 30 also flows through a clearance between the external periphery of the piston 13 and the internal periphery of the tube 11, and a clearance between the internal periphery of the piston 13 and the external periphery of the small-diameter portion 14a of the piston rod 14, the quantity is small and the flow of the liquid 30 in the damping groove 16 is mainly involved in adjustment of the damping force.

The liquid 30 that flows into the first cylinder chamber 12A partially flows into the elastic-member chamber 24 through the connection passage 26 and is absorbed by the elastic member 19. Because the liquid 30 flows in the flow passage having the maximum cross-sectional area, a relatively small damping force is applied to the piston rod 14.

Figure 6:
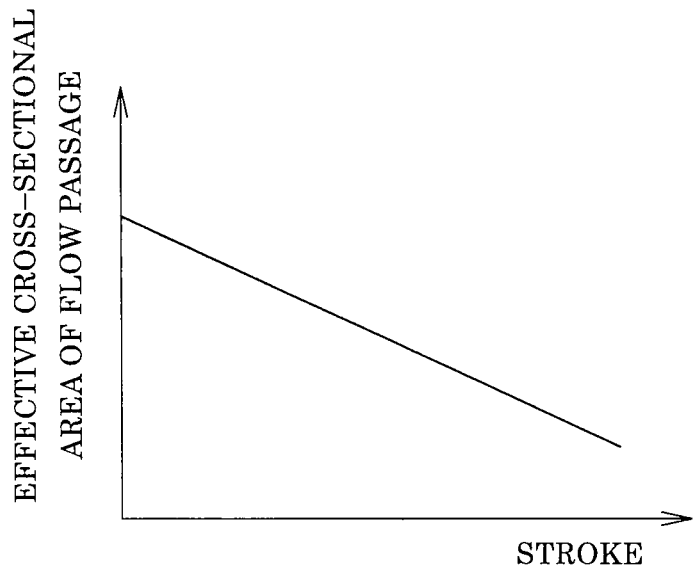
FIG. 6 is a graph showing a relation between an effective cross-sectional area of a flow passage formed by a damping groove and a stroke of a piston in a shock absorber of the present invention.
Figure 7:
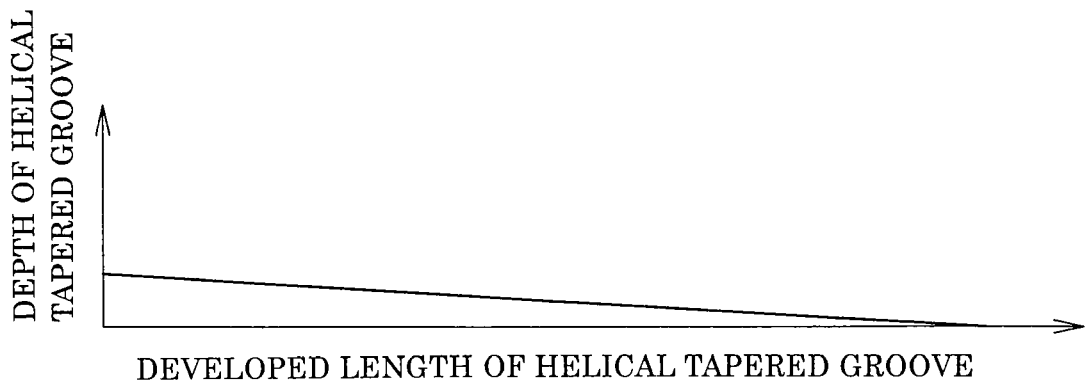
FIG. 7 is a diagram showing a relation between a length and a depth of a damping groove in a shock absorber of the present invention.

The size of the cross-sectional area of the flow passage, which is formed between the external periphery of the piston 13 and the internal periphery 15 of the cylinder chamber 12 by the damping groove 16, gradually decreases substantially in proportion to the stroke of the piston rod 14 toward the side of being pushed, as shown exaggeratedly in the diagram of FIG. 6, since the depth of the damping groove 16 on the tube internal periphery 15 becomes shallow gradually toward the head side. Therefore, a flow rate of the liquid 30 flowing from the second cylinder chamber 12B to the first cylinder chamber 12A decreases substantially in proportion to the stroke of the piston rod 14 toward the head side and the damping force gradually increases.

FIG. 2 shows a state that the piston rod 14 is at half stroke in the direction of being pushed, and in this state the flow rate of the liquid 30 flowing in the flow passage considerably decreases; then, according to the stroke of the piston rod 14 toward the head side, the damping force gradually increases, continues to absorb a mechanical impact, and finally makes the piston rod 14 halt. In FIG. 1, the piston 13 that is positioned at its stroke end is indicated by dashed lines.

After the mechanical impact applied to the piston rod 14 is absorbed and the piston rod 14 and piston 13 come to halt, upon elimination of the cause of the impact, the piston rod 14 starts to move slowly in its projecting direction by the forcing power of the return spring 18. At that time, since the depth of the damping groove 16, which the external periphery of the piston 13 faces, increases in accordance with the stroke of the piston 13, a moving speed of the piston rod 14 becomes high and the piston rod 14 returns to its initial position.

If it is desirable to realize a quick return action of the piston rod 14, a check valve may be installed, for example, in a passage provided inside the piston 13 in the axis line direction, the check valve allowing a flow of the liquid 30 to pass only from the first cylinder chamber 12A to the second cylinder chamber 12B.

The invention claimed is:
1. A shock absorber, comprising:
    a cylinder chamber formed in a tube and filled with a liquid;
    a piston disposed in the cylinder chamber so as to be freely displaced in a direction along an axis line of the cylinder chamber;
    a piston rod, one end of the piston rod being connected to the piston and the other end of the piston rod extending out from the tube; and
    an accumulator allowing the piston rod to generate a damping force by receiving the liquid from a compression side of the cylinder chamber when the piston rod is pushed into the tube by an impact force and the piston is displaced, wherein a helical damping groove, inclined relative to the axis line, is formed on an internal periphery of the cylinder chamber so as to directly come into contact with the piston within a stroke range of the piston, and the damping groove includes only one pitch, a groove width of the damping groove is constant over the entire length of the damping groove, a depth of the damping groove gradually decreases along a spiral toward the direction in which the piston rod is pushed in, the groove width of the damping groove along the axis line is equal to or greater than a length of the piston in a direction along the axis line, and a length of the piston in a direction along the axis line is smaller than a pitch of the damping groove.

2. The shock absorber according to claim 1, wherein a bottom wall of the damping groove is flat.

3. The shock absorber according to claim 1, wherein the piston is supported at a tip of the piston rod in a floating state.

4. The shock absorber according to claim 1, wherein a rod-guiding-out side end of the cylinder chamber is connected to an elastic-member chamber constituting the accumulator, the elastic-member chamber being provided therein with a flexibly constrictable and expandable elastic member.

5. The shock absorber according to claim 1, wherein the width of the damping groove is one to two times the length of the piston.

* * * * *